United States Patent
Didier et al.

(10) Patent No.: US 7,007,371 B1
(45) Date of Patent: Mar. 7, 2006

(54) METHOD OF MANUFACTURING A MAGNETIC STRIP MAGNET SPEED RING

(75) Inventors: Stanley N. Didier, Plymouth, MN (US); Scott Kessler, Brooklyn Park, MN (US)

(73) Assignee: Sauer-Danfoss Inc., Ames, IA (US)

( * ) Notice: Subject to any disclaimer, the term of this patent is extended or adjusted under 35 U.S.C. 154(b) by 278 days.

(21) Appl. No.: 10/669,997

(22) Filed: Sep. 24, 2003

(51) Int. Cl.
  *H01S 4/00* (2006.01)
(52) U.S. Cl. ............... 29/592.1; 29/593; 29/596; 29/598; 29/605; 29/890.126; 29/417; 72/70; 72/131; 72/203; 72/275; 72/294; 83/49; 83/51; 310/179; 310/208
(58) Field of Classification Search ............. 29/592.1, 29/593, 596–598, 605, 606, 890.126, 415, 29/417; 310/179, 208; 72/70, 131, 203, 72/275, 294; 83/49, 51
See application file for complete search history.

(56) References Cited

U.S. PATENT DOCUMENTS

| | | | |
|---|---|---|---|
| 4,835,505 A | 5/1989 | Hattori et al. | |
| 5,189,336 A * | 2/1993 | Sarracco | ............ 313/440 |
| 5,224,259 A | 7/1993 | Rode | |
| 5,325,055 A | 6/1994 | Geringer | |
| 5,329,196 A | 7/1994 | Rode | |
| 5,569,967 A | 10/1996 | Rode | |
| 5,589,664 A | 12/1996 | Rode | |
| 6,774,627 B1 * | 8/2004 | Yokota et al. | ............ 324/242 |
| 2005/0231315 A1 * | 10/2005 | Sentoku | ............ 335/302 |

FOREIGN PATENT DOCUMENTS

JP    57130409 A  *  8/1982

OTHER PUBLICATIONS

"Signal integrity loss in bus lines due to open shielding defects"; Avendano, V.; Champac, V.; Figueras, J.; European Test Workshop, 2003. Proceedings. The Eighth IEEE; May 25-28, 2003 pp.:79-84.*

* cited by examiner

*Primary Examiner*—A. Dexter Tugbang
*Assistant Examiner*—Paul D. Kim

(57) ABSTRACT

A method of manufacturing a speed ring in a continuous process using a magnetizing fixture and a trimming fixture. An unmagnetized magnetic strip is fed into the trolley of a magnetizing fixture, clamped stretched, and magnetized by a coil. The newly magnetized strip is then cut and fed into a trimming fixture. As the magnetized strip goes through the trimming fixture, it runs over a hall effect sensor which determines where a center of a pair of poles is located. Based on where a pair of poles is located the cutting blade of the trimming fixture is activated and a magnetic strip that can be turned into a speed ring is created.

11 Claims, 2 Drawing Sheets

METHOD OF MANUFACTURING A MAGNETIC STRIP MAGNET SPEED RING

BACKGROUND OF THE INVENTION

This invention relates to a method of manufacturing a magnetic strip into a speed ring. More specifically and without limitation, this invention relates to a continuous process using computers and microprocessors to manufacture speed rings.

A speed ring is a strip of magnetic material that is formed into a ring that can be calibrated to take readings of how fast a device is rotating. For example, a speed ring can be used to determine the speed and the direction of rotation of a rotating plate such as used in a hydraulic pump or motor. The speed ring is able to determine the speed of a rotating device by using a Hall Effect sensor that senses the number of pairs of magnetic poles (a North pole and a South pole) on the speed ring and sends this information to a microprocessor.

As the diameter of the speed ring changes, its circumference also changes as does the spacing and number of magnetic poles. Consequently, to produce multiple circumference speed rings, the length of the magnetic strip, the spacing of the pairs of poles, and the number of pole pairs must be accurately controlled.

The ability to accurately control the pole pairs becomes especially difficult when the magnetic strip needs to be formed into a circular shape of a fixed circumference. The problem is compounded by the need to make several different diameter circles. The prior art describes a way of using a fixed pole spacing magnetizing feature to create magnetized strips of material that are of varying lengths and have a whole number of pole pairs. Then, the ends of the strips are butted together in a circular ring. Creating a speed ring using this method based on the length of the magnetic material causes discontinuities in the speed ring because the ring is created using the fixed geometry of the magnetic strip.

Thus, it is a primary object of the present invention to provide a method of manufacturing a speed ring that improves upon the state of the art.

Another object of the present invention is to provide a method of manufacturing a speed ring by using microprocessors and computers.

Yet another object of the present invention is to eliminate excess machining and extra work in the process of forming a speed ring.

A further object of the present invention is to use a method of manufacturing a speed ring that determines the length of the ring by using magnetic flux instead of strip size to ensure better accuracies.

These and other objects, features, or advantages of the present invention will become apparent from the specification and claims.

BRIEF SUMMARY OF THE INVENTION

The present invention is a method of manufacturing a speed ring by feeding an unmagnetized magnetic strip into a trolley of a magnetizing fixture. The magnetic strip is then clamped and stretched to a predetermined length before a coil is lowered onto the strip that sends out an electric charge magnetizing the strip. The strip is then cut and placed into a trimming fixture. In the trimming fixture the magnetized strip goes over a Hall Effect sensor that determines what the exact length the strip should be by locating a center of a pole pair. After the sensor determines the length of the strip, the strip is cut and a speed ring is created by butting the ends of the strip together. Thus, the present invention provides for advantages in manufacturing a speed ring using microprocessors and computerized sensors that create an accurate speed ring.

DESCRIPTION OF THE INVENTION

Figure 1:
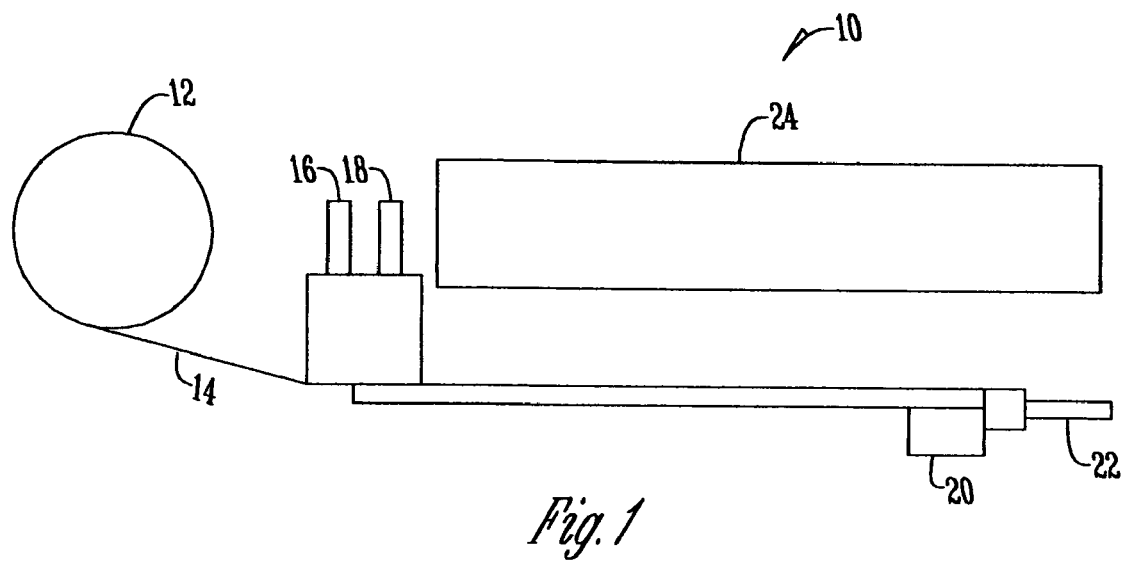
FIG. 1 is a side view of a representative magnetizing fixture.

The process for making the speed ring is accomplished by using a magnetizing fixture 10. A coil of magnetic strip material 12 is fed into the magnetizing feature 10 as an unmagnetized strip 14. The magnetizing fixture 10 also has a stationary clamp cylinder 16 and a cutting cylinder 18 that are used to hold and cut the magnetized strip 14. The magnetized strip 14 is fed into a trolley 20 that is positioned by a clamp cylinder 22. During the magnetizing process the coil 24 magnetizes the magnetic strip 14.

Figure 2:
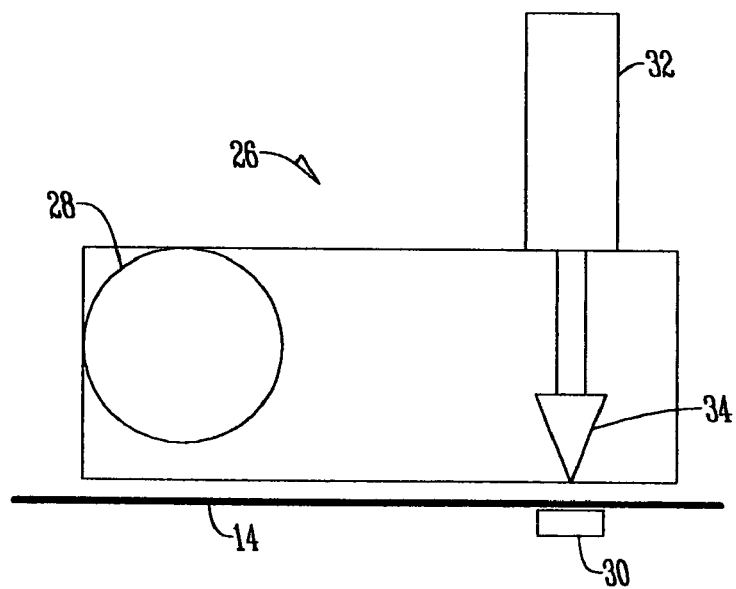
FIG. 2 is a side view of a representative trimming fixture.

As can be seen in FIG. 2, after the magnetic strip 14 is run through the magnetizing fixture 10 the strip 14 goes to a trimming fixture 26. The trimming fixture 26 has a servo motor 28 that runs the magnetic strip through to the Hall Effect sensor 30. The Hall Effect sensor 30 and the cut off cylinder 32 work to engage the blade 34 to cut the length of the magnetic strip 14.

In operation the magnetic strip 14 begins in an unmagnetized state. The material 14 is fed into the end of the magnetizing feature, and the magnetic strip 14 is installed in a slot on the trolley 20 and clamped in place by the clamp cylinder 22 and stationary clamp cylinder 16. The trolley 20 then moves to a predetermined position. The stationary clamp 16 is activated, and the computer controlled trolley 20 moves slightly to remove any slack in the magnetic strip 14. The strip 14 can also be stretched to decrease the length of the poles when measured in a relaxed state. The stretching is required to create the correct spacing so that a whole number of pole pairs will be present in the final circular device. The computer controlled trolley 20 moves a predetermined distance to do this stretching. The predetermined distance can then be stored in the computer and can be associated with an individual part number.

The coil 24 is then lowered onto the magnetic strip 14, and an electrical charge is sent through the coil 24, magnetizing the strip 14. The fixture 10 then cuts the magnetic strip 14 using the cutting cylinder 18. The coil 24 is retracted, and the magnetized strip 14 is removed and advanced to the trimming fixture 26.

A microprocessor-controlled servo motor 28 advances the magnetized strip 14 over a Hall Effect sensor 30 until it senses the center of a pair of poles. The center of the pole pairs is defined by the sinusoidal magnetic field. The distance half way between the peak and the adjacent valley is the center. This place in the curve gives the sensor 30 the greatest amount of resolution because of the slope of the wave is at the maximum at this point. It should be appreciated that by using this method the length of the magnetized strip 14 is based on the magnetic field of the magnetized strip 14, instead of the physical length of the strip 14. Therefore, there is not a noticeable output change at the joint of the magnetic strip 14 when its ends are butted together to form a speed ring 33.

Figure 3:
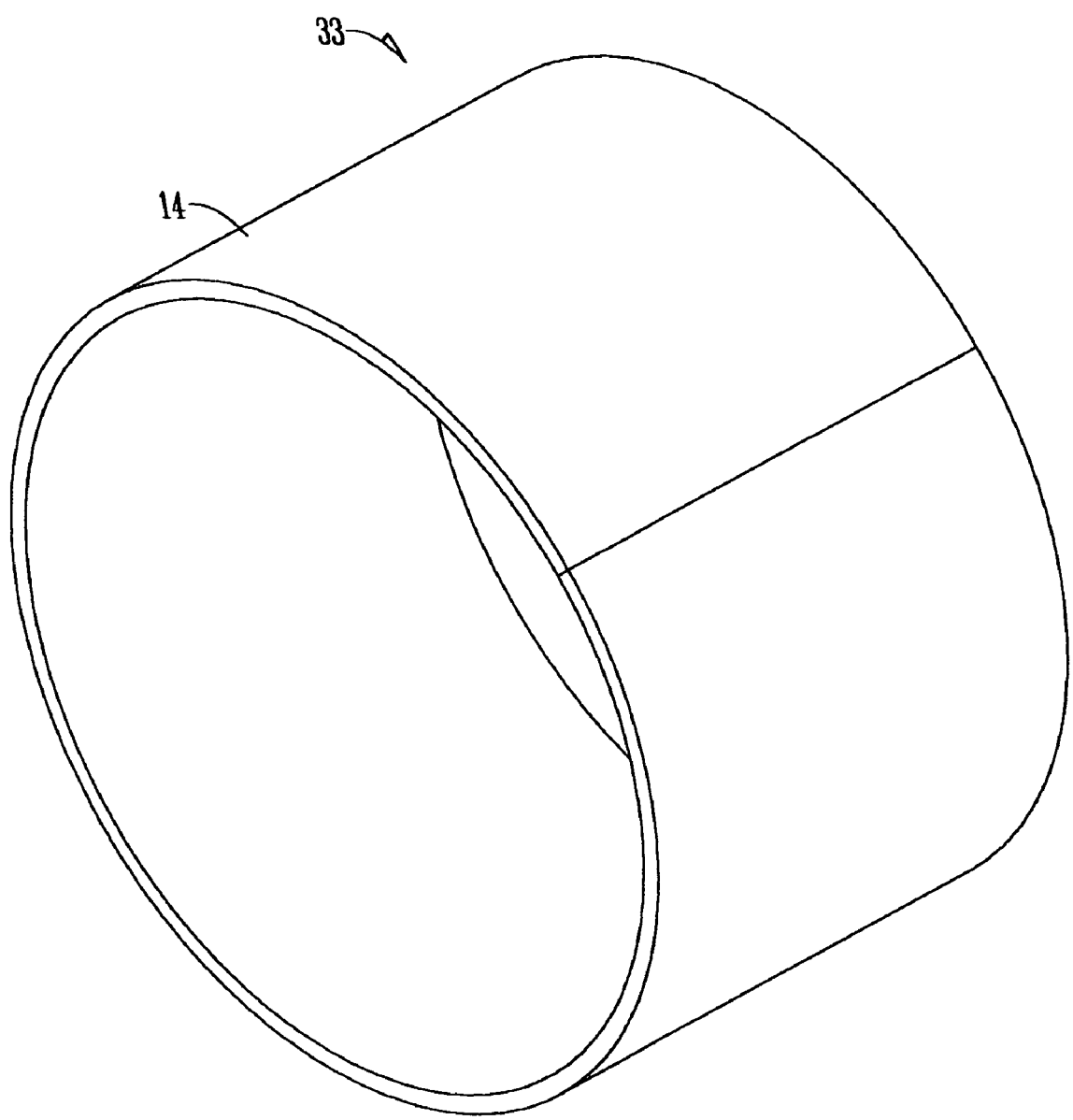
FIG. 3 is a perspective view of the magnetic strip butted together to form a speed ring.

Next, the cutting blade 34 is activated to cut the end of the magnetic strip 14, thus establishing the beginning of the final speed ring strip. The preferred way of cutting the ends would be with a computer controlled machine; however, it is conceivable that a manual process of cutting could be used in conjunction with a sensor that is measuring the correct places to cut the material. Next, the magnetized strip 14 is advanced, using a microprocessor (not shown) that counts the specified number of pair of poles. Then the microprocessor stops magnetized strip 14 so that the center of a pair of poles is directly underneath the cutting blade 34. Then the cutting blade 34 is again activated, cutting the magnetized strip 14 to its final length using the Hall Effect sensor 30 to measure the center of the last set of pair of poles. This creates a magnetic strip 14, which when butted together (as seen in FIG. 3) in its circular shape gives a magnetic field without discontinuities. The ring 33 is then installed inside of another ring (not shown) with a fixed inside diameter for use.

By using the magnetic field of the strip 14 to determine the cutting location on the strip 14 the manufacturing process yields a much higher repeatability than when the physical dimensions are used to determine the cutting locations. After this process the magnetic strip 14 can be installed in the inside of a ring with a fixed inside diameter to create a speed ring.

Because of this method a single coil that has a fixed number of poles in a fixed pole spacing can be used to produce a large variety of magnetic strips of varying lengths. These strips will also vary in the number of pairs of poles and vary in pole spacing. All of this may be controlled by a computer. It should also be appreciated by using both the magnetized fixture 10 and the trimming fixture 26 a method is present whereby two independent features are combined together in a common continuous process.

It will be appreciated by those skilled in the art that other various modifications could be made to the device without the parting from the spirit in scope of this invention. All such modifications and changes fall within the scope of the claims and are intended to be covered thereby.

What is claimed is:

1. The method of manufacturing a speed ring, steps comprising:
    feeding an un-magnetized magnetic strip from a coil into a magnetizing fixture;
    stretching the magnetic strip to a predetermined length;
    magnetizing the magnetic strip by sending an electric charge through the strip;
    cutting the magnetized strip and retracting the coil;
    advancing the magnetized strip to a trimming fixture having a Hall Effect sensor;
    detecting a center of a pair of poles with the Hall Effect sensor;
    cutting a first end of the magnetized strip;
    detecting the number of pairs of poles in the magnetizxed strip;
    cutting the magnetized strip at the center of the pair of poles, based on the number of pairs of poles to create a second end; and
    butting the first and second ends together.

2. The method of manufacturing the speed ring of claim 1 steps further comprising recording the length of the stretched magnetic strip and assigning a part number to the magnetic strip according to the stretched length.

3. The method of manufacturing the speed ring of claim 1 wherein the predetermined length is determined by a microprocessor.

4. The method of manufacturing the speed ring of claim 1 wherein the magnetized strip is installed into a slot on a trolley that within the magnetized fixture.

5. The method of manufacturing the speed ring of claim 4 wherein the trolley is computer controlled.

6. The method of manufacturing the speed ring of claim 5 wherein the computer controlled trolley moves laterally to pull the magnetic strip away from the coil, removing slack from the magnetic strip.

7. The method of manufacturing a speed ring described in claim 4 wherein the trolley is controlled by a computer that determines and records the length of the stretched magnetic strip.

8. The method of manufacturing the speed ring of claim 1 wherein the magnetized strip is advance over the Hall Effect sensor by a microprocessor-controlled servomotor.

9. The method of manufacturing the speed ring of claim 1 further comprising the step of installing the magnetic strip in the inside of a ring with a fixed inside diameter, with the ends butted together.

10. The method of manufacturing the speed ring of claim 8 wherein the ring is a wheel.

11. The method of manufacturing a speed ring, steps comprising:
    feeding an un-magnetized magnetic strip from a coil into the slot of a trolley of a magnetizing fixture;
    clamping the magnetic strip into place;
    stretching the magnetic strip to a predetermined length to create spacing between magnetic poles;
    magnetizing the magnetic strip by sending an electric charge through the strip;
    cutting the magnetized strip and retracting the coil;
    advancing the magnetized strip to a trimming fixture having a Hall Effect sensor;
    detecting a center of a pair of poles with the Hall Effect sensor;
    cutting a first end of the magnetized strip;
    detecting the number of pairs of poles to determine a location of a final cut;
    cutting the magnetized strip at the center of the pair of poles to create a second end; and
    butting the first and second ends together.

* * * * *